(12) United States Patent
Nakano

(10) Patent No.: US 6,674,059 B1
(45) Date of Patent: Jan. 6, 2004

(54) OBJECTIVE LENS AND OPTICAL PICKUP

(75) Inventor: Satoshi Nakano, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/857,468

(22) PCT Filed: Oct. 4, 2000

(86) PCT No.: PCT/JP00/06918

§ 371 (c)(1),
(2), (4) Date: Sep. 12, 2001

(87) PCT Pub. No.: WO01/26103

PCT Pub. Date: Apr. 12, 2001

(30) Foreign Application Priority Data

Oct. 6, 1999 (JP) .......................... P11-285960

(51) Int. Cl.[7] .............................................. G02B 27/40
(52) U.S. Cl. .................. 250/201.5; 250/216; 369/44.12
(58) Field of Search ........................... 250/201.5, 216, 250/208.1, 214.1, 237 R, 237 G; 369/44.12, 44.14; 359/16, 19, 565

(56) References Cited

U.S. PATENT DOCUMENTS

| | | | | |
|---|---|---|---|---|
| 4,733,065 A | * | 3/1988 | Hoshi et al. ............. | 250/206.2 |
| 5,633,852 A | * | 5/1997 | Maruyama et al. .... | 369/112.08 |
| 5,696,750 A | * | 12/1997 | Katayama ............. | 369/112.06 |
| 5,726,436 A | * | 3/1998 | Oka et al. .............. | 250/201.5 |
| 5,969,862 A | * | 10/1999 | Maruyama ............. | 359/565 |
| 6,034,939 A | * | 3/2000 | Takasawa et al. ...... | 369/112.17 |
| 6,061,324 A | * | 5/2000 | Arai et al. ............. | 369/112.26 |
| 6,313,956 B1 | * | 11/2001 | Saito ..................... | 359/721 |
| 6,337,841 B1 | * | 1/2002 | Kim et al. .............. | 369/112.06 |
| RE37,717 E | * | 5/2002 | Eguchi et al. .......... | 359/739 |

FOREIGN PATENT DOCUMENTS

| | | |
|---|---|---|
| JP | 8-339571 | 12/1996 |
| JP | 9-179020 | 7/1997 |
| JP | 10-199021 | 7/1998 |
| JP | 10-255305 | 9/1998 |
| JP | 10-268117 | 10/1998 |
| JP | 10-289464 | 10/1998 |
| JP | 11-16194 | 1/1999 |
| JP | 11-337818 | 12/1999 |
| JP | 2000-81566 | 3/2000 |

OTHER PUBLICATIONS

European Search Report.

* cited by examiner

*Primary Examiner*—Stephone B. Allen
(74) *Attorney, Agent, or Firm*—Rader, Fishman & Grauer PLLC; Ronald P. Kananen

(57) ABSTRACT

By providing an area of a smaller numerical aperture and an area of a greater numerical aperture on an objective lens, forming holograms of different characteristics corresponding to the respective areas, and using diffracted light beams of the same order of light beams having different wavelengths emitted from two light sources so as to carry out recording to and reproduction from an optical disc, it is possible to carry out recording and reproduction of information signals to and from a plurality of optical recording media of different types while efficiently using the light beams, and to eliminate the problem of a stray light due to an unwanted diffracted light.

19 Claims, 6 Drawing Sheets

OBJECTIVE LENS AND OPTICAL PICKUP

TECHNICAL FIELD

This invention relates to an objective lens for condensing a light beam, and particularly to an objective lens which is advantageously used in an optical pickup device and an optical pickup device using this objective lens.

BACKGROUND ART

Conventionally, an optical pickup device has been proposed which enables recording or reproduction of information signals with respect to a plurality of optical recording media of different standards, such as different information signal recording densities and different recording capacities, for example, an optical disc of the DVD (digital versatile disc) standard and an optical disc of the CD (compact disc) standard.

An optical pickup device of this type is described in the Japanese Publication of Unexamined Patent Application No.H7-98431. In the optical pickup device described in this publication, a hologram is formed at a part of the surface of an objective lens so as to correct the spherical aberration, which is a problem in the case of using optical discs of different standards. The objective lens used in this optical pickup device is formed to condense a light beam with a wavelength of 650 nm onto the signal recording layer of the optical disc at a numerical aperture (NA) of 0.6 via a cover layer with a thickness of 0.6 mm, for example, the disc substrate of the optical disc. The hologram formed on the surface of the objective lens is formed to condense a first-order light of a light beam with a wavelength of 780 nm onto the signal recording layer of the optical disc at a numerical aperture (NA) of 0.45 via a cover layer with a thickness of 1.2 mm, for example, the disc substrate of the optical disc.

The optical pickup device carries out recording and reproduction of information signals to and from an optical disc of the DVD standard by using a zeroth-order light transmitted through the hologram, of a light beam with a wavelength $\lambda$ of 650 nm, and a transmitted light in the area where the hologram is not formed. The optical pickup device also carried out recording and reproduction of information signals to and from an optical disc of the CD standard by using a first-order light diffracted by the hologram, of a light beam with a wavelength $\lambda$ of 780 nm.

In the optical pickup device having the objective lens as described above, the diffraction efficiency of the zeroth-order light transmitted through the hologram, of the light beam with a wavelength $\lambda$ of 650 nm, and the diffraction efficiency of the first-order light in the hologram, of the light beam with a wavelength $\lambda$ of 780 nm, cannot be increased to approximately 40% or more. In this optical pickup device, the use efficiency of a back-and-forth light beam, which is emitted from the light source, passed through the objective lens and a diffractive optical element to reach the optical recording medium, then reflected from the optical recording medium, again passed through the objective lens and the diffractive optical element, and received by a light-receiving element, is 16% or lower since the beam passes through the diffractive optical element twice.

The optical pickup device using the hologram also has a problem of a stray light due to an unwanted diffracted light.

Moreover, in the case where the objective lens is made of a synthetic resin, there is a problem of aberration, generated by a change in the refractive index of the synthetic resin due to a temperature change.

DISCLOSURE OF THE INVENTION

In view of the foregoing status of the art, it is an object of the present invention to provide a new optical pickup device and a new optical lens which overcome the problems of the conventional optical pickup device and objective lens.

It is another object of the present invention to provide an optical pickup device and an objective lens which enable recording and reproduction of information signals to and from a plurality of types of optical recording media having different information signal recording densities, while efficiently using a light beam emitted from a light source.

It is still another object of the present invention to provide an optical pickup device and an objective lens which enable restraint of generation of a stray light due to an unwanted diffracted light and generation of aberration due to a temperature change.

An objective lens according to the present invention comprises a convex lens and a diffractive optical element provided at least on one surface or in the vicinity of the convex lens. When the convex lens condenses an incident light beam onto a condensation surface via a parallel plate with a predetermined thickness, correction of the spherical aberration is insufficient in the state where the diffractive optical element does not exist, and a light beam diffracted by the diffractive optical element is condensed onto the condensation surface in the state where the spherical aberration is corrected.

An optical pickup device according to the present invention comprises two light sources for emitting light beams with different wavelengths, an objective lens for condensing the respective light beams emitted from the respective light sources onto a signal recording surface of an optical recording medium via a transparent cover layer provided on the optical recording medium, a light beam branch element for branching a light beam reflected by the signal recording surface from an optical path returning to the light source, and a photodetector for receiving the light beam branched by the light beam branch element. The objective lens is made up of a convex lens and a diffractive optical element provided at least on one surface or in the vicinity of the convex lens, and condenses diffracted lights of the same order generated by the diffractive optical element, of the two light beams with different wavelengths emitted from the respective light sources, onto the signal recording surface, thereby condensing the respective light beams onto the signal recording surface in the state where the spherical aberration generated in the transparent cover layer is corrected.

An optical pickup device according to the present invention comprises a light source for emitting a light beam, an objective lens for condensing the light beam emitted from the light source onto a signal recording surface of an optical recording medium, a light beam branch element for branching a light beam reflected by the signal recording surface from an optical path returning to the light source, and a photodetector for receiving the light beam branched by the light beam branch element. The objective lens used in this device is made up of a convex lens made of a synthetic resin and a blazed-shape hologram provided at least on one surface of the convex lens, and uses a plus-first-order diffracted light or a minus-first-order diffracted light of the hologram, thereby canceling the spherical aberration generated by a change in the refractive index of the convex lens made of the synthetic resin due to a temperature change.

Other objects and specific advantages of the present invention will be clarified further from the following description of embodiments.

BEST MODE FOR CARRYING OUT THE INVENTION

An objective lens according to the present invention and an optical pickup device using this objective lens will now be described with reference to the drawings.

Figure 1:
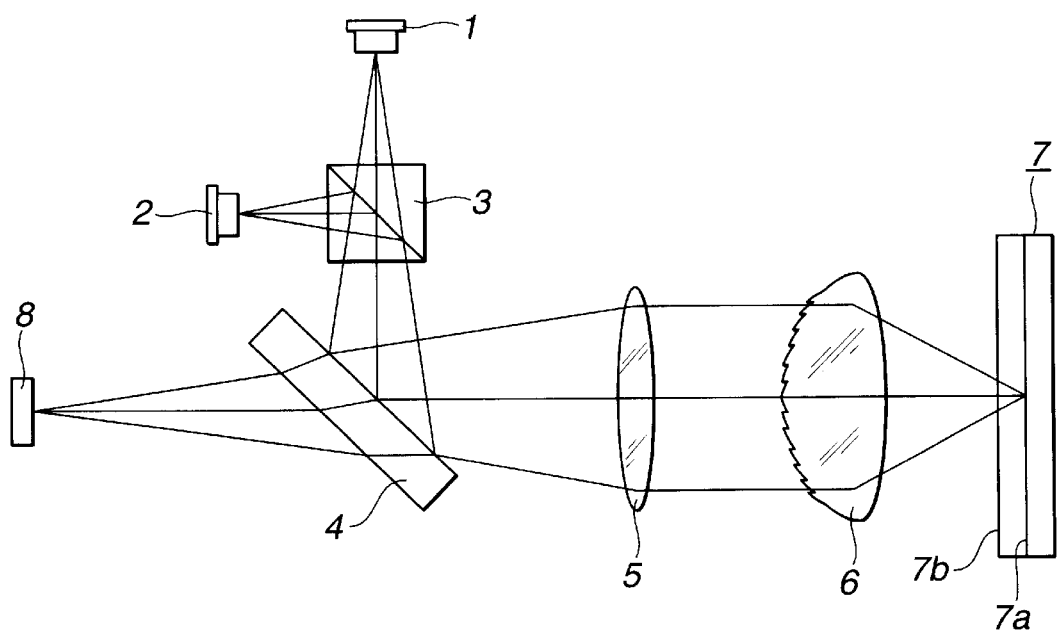
FIG. 1 is a side view showing an objective lens and an optical pickup device using this objective lens.

The optical pickup device using the objective lens according to the present invention has a first light source 1 for emitting a light beam with a first wavelength $\lambda 1$ and a second light source 2 for emitting a light beam with a second wavelength $\lambda 2$, as shown in FIG. 1. Semiconductor lasers are used for these light sources. The light beam with the first wavelength $\lambda 1$ emitted from the first light source 1 and the light beam with the second wavelength $\lambda 2$ emitted from the second light source 2 are combined onto the same optical path by a beam splitter prism 3 and are reflected toward a collimating lens 5 by a dichroic beam splitter 4, which is a light beam branch element.

The collimating lens 5 collimates the incident light beams and causes the collimated light beams to be incident on a hologram-integrated objective lens 6. The hologram-integrated objective lens 6 is constituted by a convex lens 6 made of a synthetic resin and a hologram as a diffractive optical element integrally formed on the entire surface of one side of the convex lens. The light beams incident on the objective lens 6 are transmitted through a transparent cover layer 7b constituting an optical disc 7 and are condensed onto a signal recording surface 7a of the optical disc 7 as an optical recording medium. The transparent cover layer 7b is a disc substrate constituting the optical disc.

The first and second light sources 1, 2 of the optical pickup device according to the present invention are not used simultaneously. In the case where a first optical disc is used, a light beam is emitted from the first light source 1. In the case where a second optical disc is used, a light beam is emitted from the second light source 2. The first optical disc has a transparent cover layer constituting the disc substrate with a first thickness of 0.6 mm, and is constituted to carry out recording and reproduction of information signals by using an objective lens with a numerical aperture (NA) of 0.6 and a light beam with a wavelength of 630 to 660 nm. As an optical disc of this type, an optical disc of the DVD (digital versatile disc) standard is used.

The second optical disc has a transparent cover layer constituting the disc substrate with a second thickness of 1.2 mm, and is constituted to carry out recording and reproduction of information signals by using an objective lens with a numerical aperture (NA) of 0.4 to 0.55 and a light beam with a wavelength of 775 to 795 nm. As an optical disc of this type, an optical disc of the CD (compact disc) standard is used.

With respect to the discs having different recording densities, if the first optical disc is an optical disc of the DVD standard, a light beam with the first wavelength $\lambda 1$ of 630 to 660 nm is used for recording and reproduction, and if the second optical disc is an optical disc of the CD format, a light beam with the second wavelength $\lambda 2$ of 775 to 795 nm is used for recording and reproduction.

A light beam incident on the optical disc 7 and reflected on the signal recording surface 7a of the optical disc 7 is transmitted through the objective lens 6 and the collimating lens 5, then transmitted through the parallel-plate beam splitter 4, and detected by a photodiode 8 as a photodetector.

Figure 2:
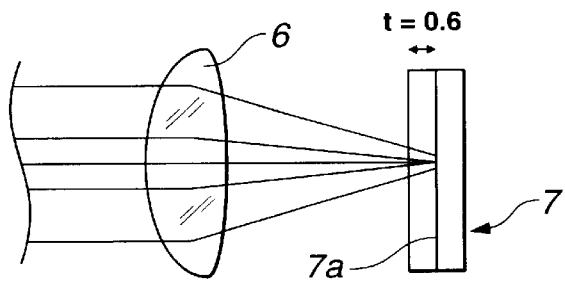
FIG. 2 is a side view showing an example in which a transparent cover layer with a first thickness is formed, for illustrating a convex lens constituting the objective lens.
Figure 3:
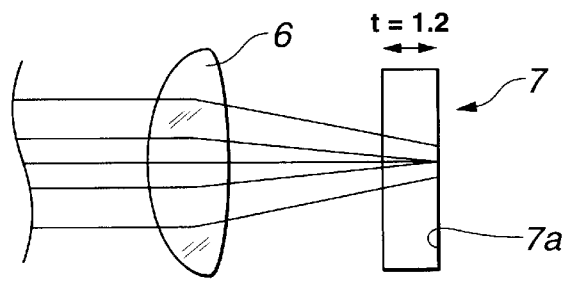
FIG. 3 is a side view showing an example in which a transparent cover layer with a second thickness is formed.

The convex lens, which is the base of the hologram-integrated objective lens 6, is formed in a surface shape such that the numerical aperture (NA) is 0.6 and that the spherical aberration is minimized for a virtual disc having a transparent cover layer with a thickness of −2.5 mm. The thickness of the transparent cover layer of the virtual disc is now assumed to be t0. In the case where a light beam is condensed by the convex lens alone, correction of the spherical aberration is insufficient (under) with respect to the first optical disc having a transparent cover layer with a thickness of t1 of 0.6 mm, as shown in FIG. 2. In this case, the spherical aberration with respect to the second optical disc having a transparent cover layer with a thickness t2 of 1.2 mm is 1.2 times greater than the spherical aberration in the case where the thickness t1 of the transparent cover layer is 0.6 mm, as shown in FIG. 3 and the following equation.

$$(t2-t0)/(t1-t0)=1.2$$

Figure 4:
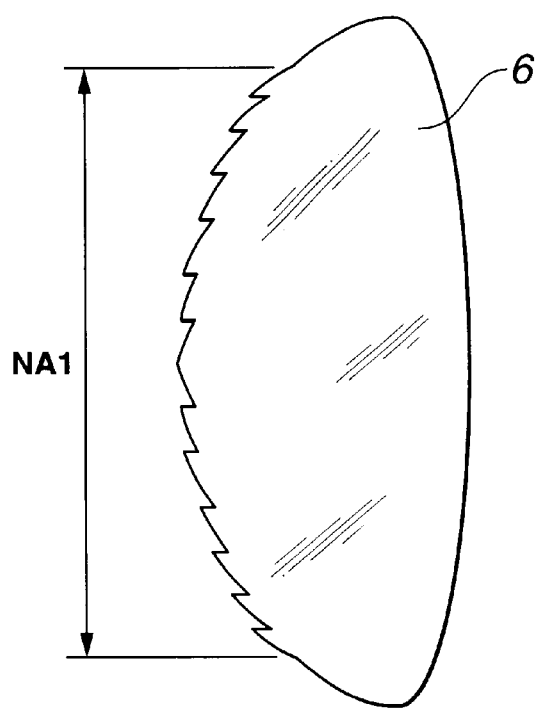
FIG. 4 is a cross-sectional view showing the objective lens according to the present invention.
Figure 5:
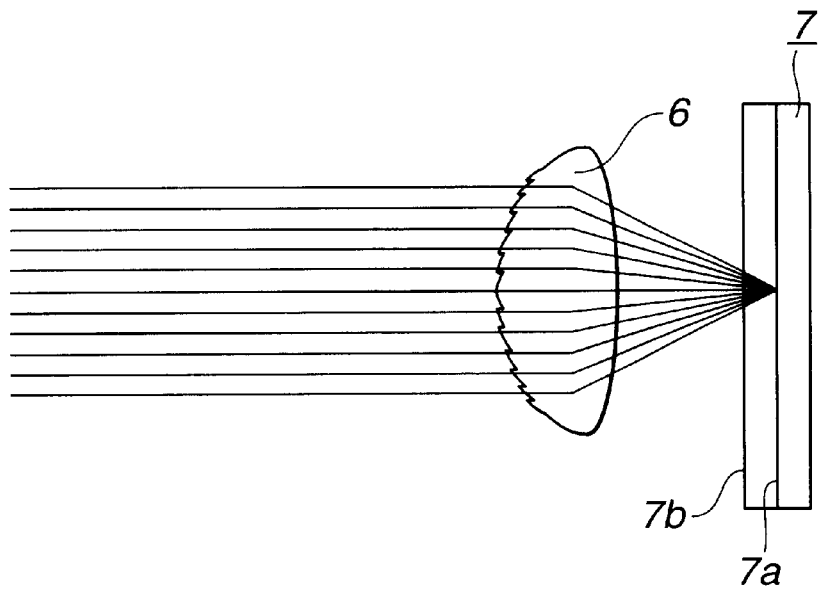
FIG. 5 is a cross-sectional view showing the objective lens according to the present invention.

The hologram-integrated objective lens 6 of the present invention is produced by forming a blazed-shape hologram integrally on a first surface (on the light source side) of the convex lens as the base, as shown in FIG. 4. With this objective lens 6, the spherical aberration of a first-order diffracted light generated by the blazed-shape hologram with respect to the light beam having the first wavelength $\lambda 1$ of 630 to 660 nm incident on the transparent cover layer having the thickness t1 of 0.6 mm is corrected to not more than $(\lambda 1)/100$ RMS, preferably not more than $(\lambda 1)/200$ RMS, as shown in FIG. 5.

In this case, the angle of diffraction of a first-order diffracted light of the light beam having the second wavelength $\lambda 2$ of 775 to 795 nm, transmitted through the hologram, is 1.2 times the angle of diffraction of the first-order diffracted light having the first wavelength $\lambda 1$, as expressed by the following equation.

$$\lambda 2/\lambda 1=1.2$$

Therefore, with this hologram, the spherical aberration of the first-order diffracted light with respect to the light beam having the second wavelength $\lambda 2$ incident on the transparent cover layer having the thickness t2 of 1.2 mm can also be corrected to approximately $(\lambda 2)/30$ RMS or less.

Figure 6:
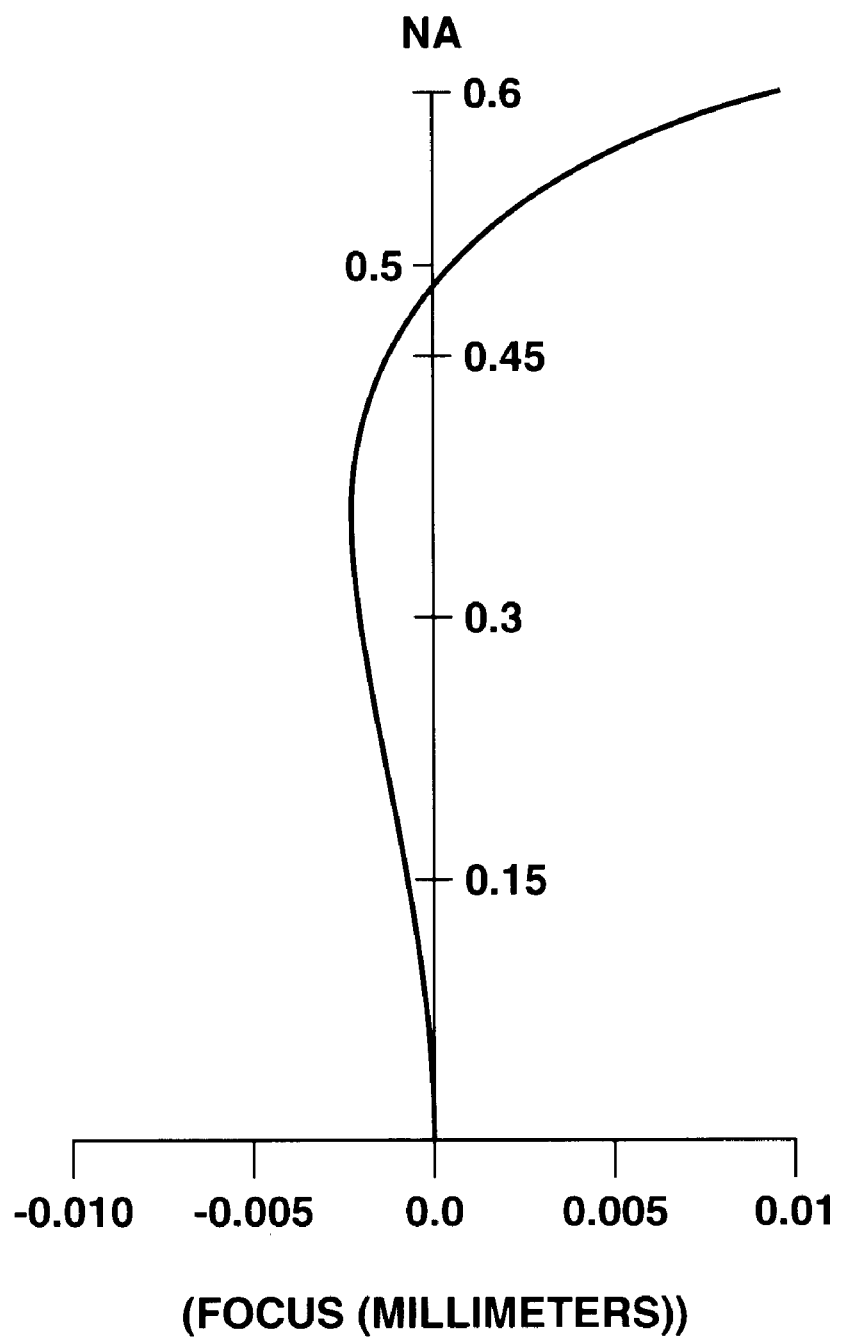
FIG. 6 is a graph showing optical characteristics of the objective lens according to the present invention.

On the assumption that the hologram-integrated objective lens 6 has a numerical aperture NA2 of 0.5, it is understood that the spherical aberration of the first-order diffracted light of the light beam having the second wavelength $\lambda 2$ of 775 to 795 nm incident on the transparent cover layer having the second thickness t2 of 1.2 mm is restrained to a sufficiently low level with respect to a light beam passed through an area where the numerical aperture (NA) is less than 0.5, that is, smaller than the second numerical aperture NA2, as shown in FIG. 6. On the other hand, the spherical aberration is suddenly increased with respect to a light beam passed through an area where the numerical aperture (NA) is 0.5 or greater, that is, greater than the second numerical aperture NA2.

Figure 7:
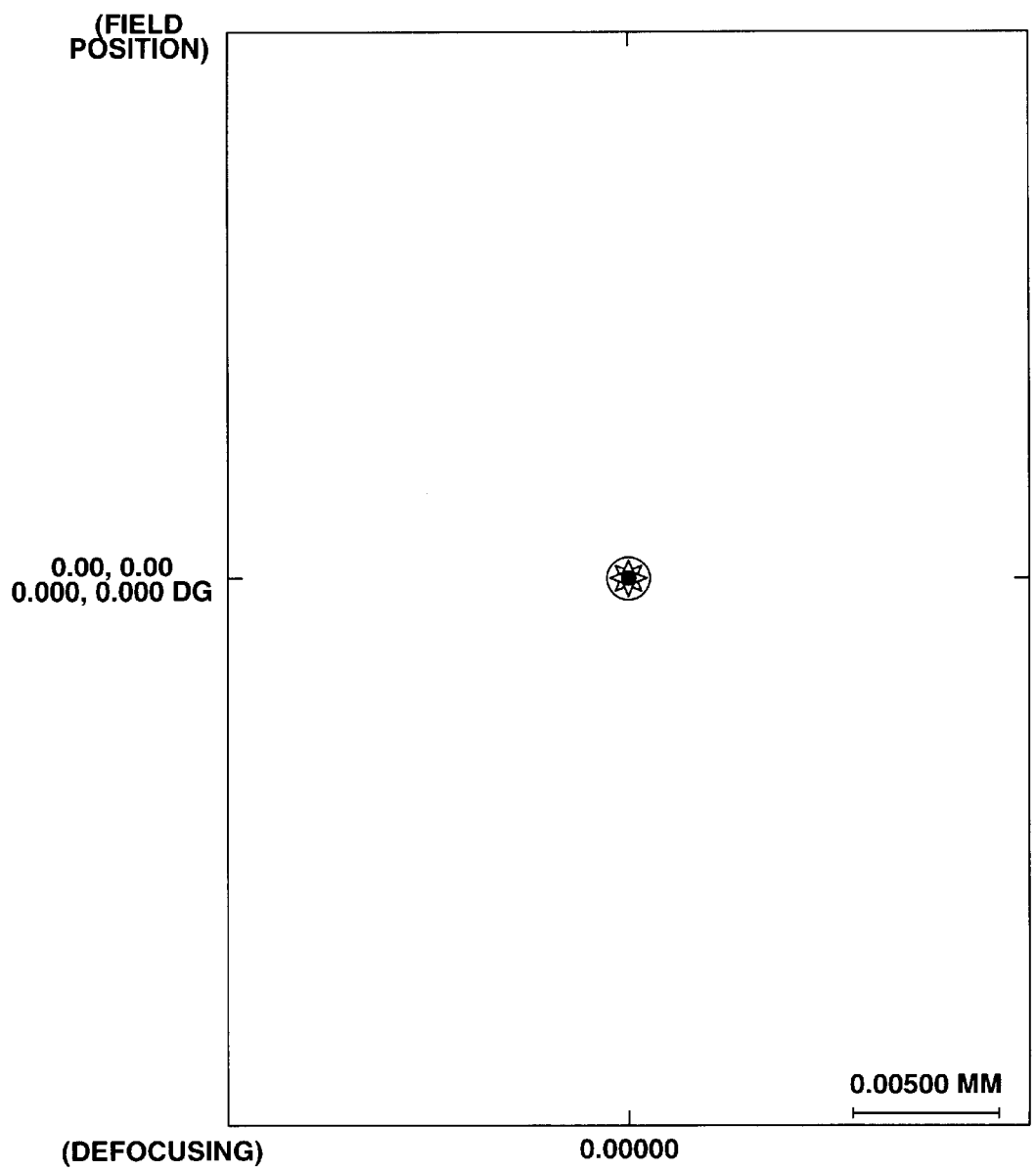
FIG. 7 is a spot diagram with respect to an area where the numerical aperture of the objective lens is smaller than a second numerical aperture NA2.
Figure 8:
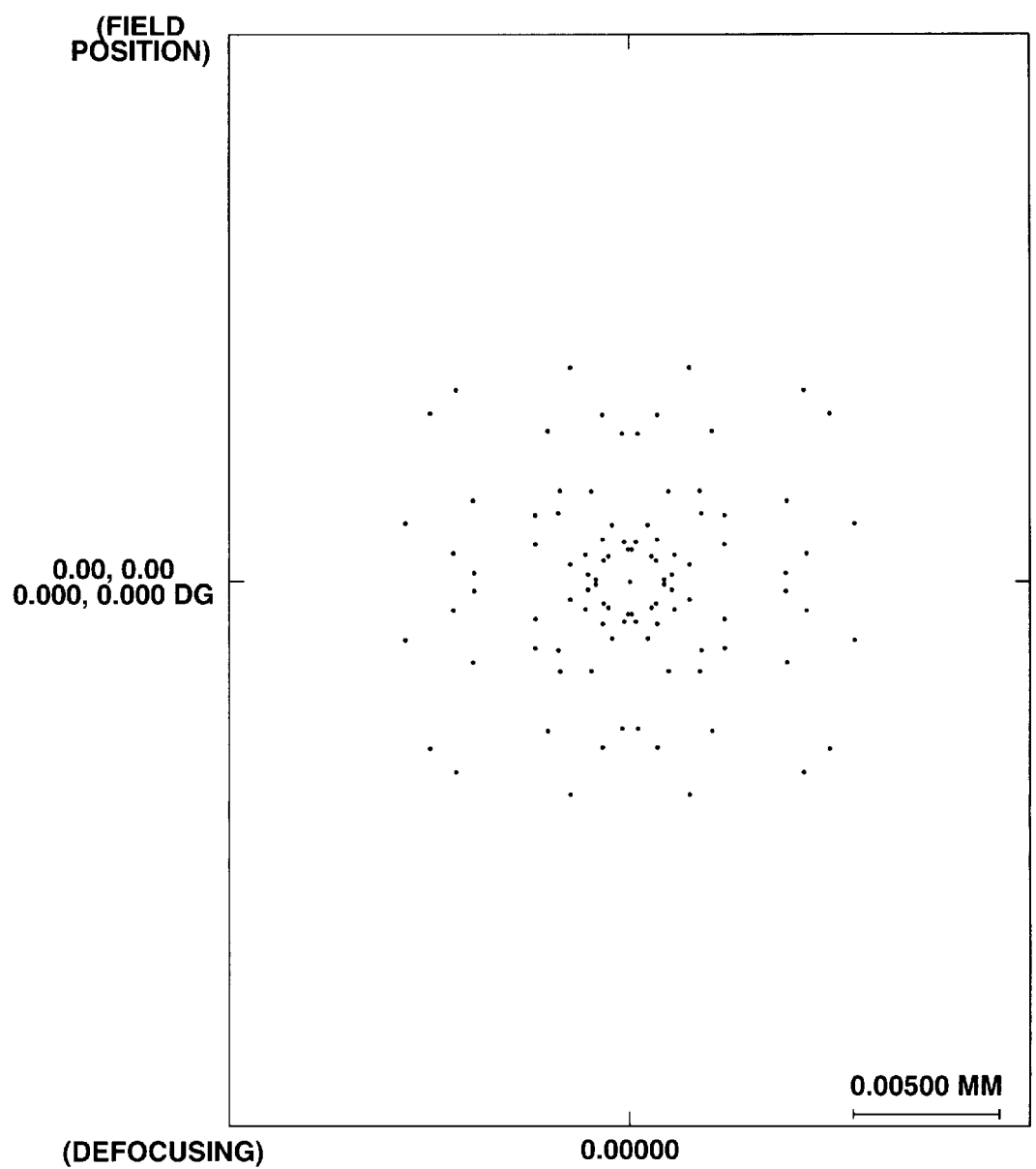
FIG. 8 is a spot diagram with respect to an area where the numerical aperture representing the characteristics of the objective lens is greater than the second numerical aperture NA2.

FIGS. 7 and 8 show spot diagrams in the case where the light beam with the second wavelength $\lambda 2$ is transmitted through the transparent cover layer with the second thickness t2 and condensed onto the signal recording surface of the optical disc by using the hologram-integrated objective lens 6 of the present invention. FIG. 7 shows spots generated by the area where the numerical aperture (NA) is smaller than the second numerical aperture NA2, and FIG. 8 shows spots generated by the area where the numerical aperture (NA) is greater than the second numerical aperture NA2. As is clear from FIG. 8, the spots of the light beam passed through the area where the numerical aperture (NA) is greater than the second numerical aperture NA2 are broadly scattered and therefore have little influence on reading of information signals from the optical disc.

In the case of recording and reproduction of information signals to and from an optical disc of the DVD standard, the optical pickup device using the objective lens according to the present invention uses a first-order diffracted light generated by the hologram when diffracting the light beam with the first wavelength $\lambda 1$ of 630 to 660 nm. In the case of recording and reproduction of information signals to and from an optical disc of the CD standard, the optical pickup device uses a first-order diffracted light generated by the hologram when diffracting the light beam with the second wavelength $\lambda 2$ of 775 to 795 nm. The light beam with the first wavelength $\lambda 1$ and the light beam with the second wavelength $\lambda 2$ are not limited to the first-order diffracted lights as long as they are of the same order. By selecting an appropriate depth of the blazed-shape hologram, the diffraction efficiency of the first-order diffracted light generated by transmitting the light beam with the first wavelength $\lambda 1$ of 630 to 660 nm and the diffraction efficiency of the first-order diffracted light generated by transmitting the light beam with the second wavelength $\lambda 2$ of 775 to 795 nm can be improved to not less than 75%, preferably not less than 90%.

If a light beam with a third wavelength $\lambda 3$ that is longer than the second wavelength $\lambda 2$ of 775 to 795 nm is used and the numerical aperture (NA) of the objective lens 6 is set to a third numerical aperture NA3 that is smaller than the second numerical aperture NA2 of 0.5, the objective lens 6 of the present invention can correct the spherical aberration in the case where the transparent cover layer has a third thickness t3 that is greater than the second thickness t2 of 1.2 mm, to $\lambda 3/50$ RMS or less, using the first-order diffracted light generated by the diffractive optical element.

Another example of the objective lens 6 according to the present invention will now be described with reference to FIG. 9.

Figure 9:
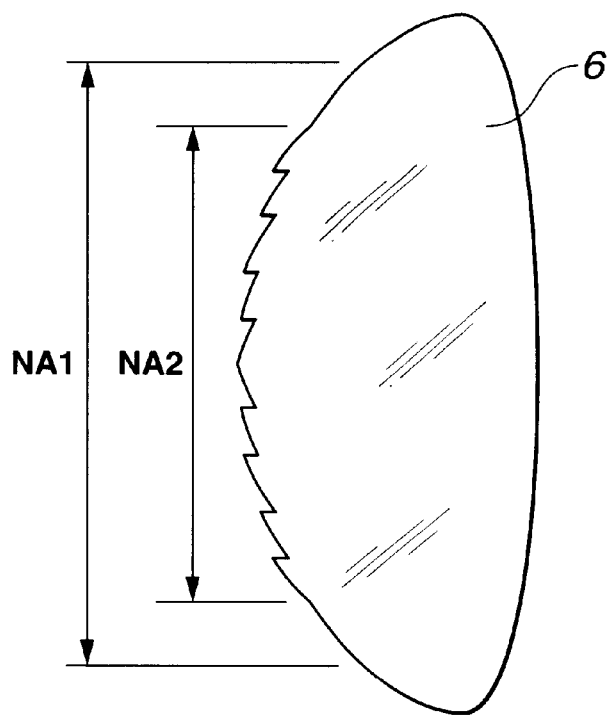
FIG. 9 is a cross-sectional view showing another example of the objective lens according to the present invention.

The objective lens 6 shown in FIG. 9 is formed similarly to the foregoing objective lens 6, with respect to the area where the numerical aperture (NA) is smaller than the second numerical aperture NA2 of 0.5. With respect to the area where the numerical aperture (NA) is greater than the second numerical aperture NA2, the surface shape of the convex lens as the base is set so that the spherical aberration is minimized for the optical disc having a transparent cover layer with the first thickness t1 of 0.6 mm, and no hologram element is provided in the area where the numerical aperture (NA) is greater than the second numerical aperture NA2.

By thus constituting the objective lens 6, it is possible to maintain the spherical aberration of the light beam having the first wavelength $\lambda 1$ incident on the transparent cover layer having the first thickness t1 to a low level, in the area where the numerical aperture (NA) is smaller than the first numerical aperture NA1 of 0.6, that is, on the entire surface of the convex lens, while maintaining the spherical aberration of the light beam having the second wavelength $\lambda 2$ incident on the transparent cover layer having the second thickness t2 to a low level, in the area where the numerical aperture (NA) is smaller than the second numerical aperture NA2 of 0.5, and to greatly increase the spherical aberration of the light beam having the second wavelength $\lambda 2$ incident on the transparent cover layer having the second thickness t2, in the area where the numerical aperture (NA) is greater than the second numerical aperture NA2.

As the objective lens 6 is constituted as shown in FIG. 9, when the light beam with the second wavelength $\lambda 2$ of 775 to 795 nm is condensed on the signal recording surface of the second optical disc having the transparent cover layer with the second thickness t2 of 1.2 mm, the light beam is transmitted through the area where the numerical aperture (NA) is greater than the second numerical aperture NA2. Thus, it is possible to increase the diameter of the spot of the light beam formed on the signal recording surface in comparison with the case where the foregoing objective lens is used, and to realize more accurate reading of information signals recorded on the optical disc of the CD standard having the transparent cover layer with the thickness of 1.2 mm.

Alternatively, in the area where the numerical aperture (NA) is greater than the second numerical aperture in the objective lens used in the optical pickup device according to the present invention, a diffraction element can be provided which has a smaller depth than the hologram element in the area where the numerical aperture is smaller than the second numerical aperture NA2. Thus, the diffraction efficiency of the first-order diffracted light of the light beam having the first wavelength $\lambda 1$ of 630 to 660 nm transmitted through the area where the numerical aperture (NA) is smaller than the second numerical aperture NA2, and the diffraction efficiency of the zeroth-order light of the light beam having the first wavelength $\lambda 1$ transmitted through the area where the numerical aperture (NA) is greater than the second numerical aperture NA2, can be made equal to each other. By doing so, it is possible to adjust the quantity of light transmitted through the area where the numerical aperture (NA) is greater than the second numerical aperture NA2, that is, the outer peripheral portion of the objective lens.

Furthermore, in the objective lens used in the optical pickup device according to the present invention, the spherical shape of the convex lens and the hologram pattern may be varied between the area where the numerical aperture (NA) is smaller than the second numerical aperture NA2 of 0.5 and the area where the numerical aperture (NA) is greater than the second numerical aperture NA2. Specifically, the surface shape of the convex lens as the base is constituted so that the spherical aberration of the first-order diffracted light of the light beam having the second wavelength λ2 of 775 to 795 nm incident on the transparent cover layer having the second thickness t2 of 1.2 mm is restrained to a low level, in the area where the numerical aperture (NA) is smaller than the second numerical aperture NA2 of 0.5, and so that the spherical aberration is minimized in the area where the numerical aperture (NA) is greater than the second numerical aperture NA2, on the assumption that the thickness of the transparent cover layer of the virtual disc is smaller than the first thickness t1 and greater than the foregoing thickness t0, for example, −1.0 mm.

In this case, the curvature of the curved surface in the area where numerical aperture (NA) is smaller than the second numerical aperture NA2 of 0.5 and the curvature of the curved surface in the area where the numerical aperture (NA) is greater than the second numerical aperture NA2 in the objective lens are equal to each other and the thickness of the lens is caused to have the same value in both area. However, in the area where the numerical aperture (NA) is greater than the second numerical aperture NA2, a virtual thickness in the case where it is virtually extended to the center of the lens is employed.

By thus constituting the objective lens, the spherical aberration with respect to the transparent cover layer having the first thickness t1 of 0.6 mm in the area where the numerical aperture (NA) is smaller than the second numerical aperture NA2 of 0.5 is insufficiently (under) corrected, and is smaller than the spherical aberration generated in the portion corresponding to the area where the numerical aperture (NA) is greater than the second numerical aperture NA2.

In order to correct the spherical aberration of the plus-first-order diffracted light of the light beam having the first wavelength λ1 of 630 to 660 nm incident on the transparent cover layer having the first thickness t1, a hologram is formed also in the area where the numerical aperture (NA) is greater than the second numerical aperture NA2.

In this case, the spherical aberration of the light beam having the second wavelength λ2 of 775 to 795 nm, transmitted through the area where the numerical aperture (NA) is greater than the second numerical aperture NA2 and incident on the transparent cover layer having the second thickness t2, is not sufficiently corrected even by the hologram and becomes greater spherical aberration than in the objective lens 6 shown in FIG. 4. Therefore, when recording or reproducing information signals to or from the optical disc having the transparent cover layer with the second thickness t2 of 1.2 mm by using the light beam with the second wavelength λ2, the light beam transmitted through the area where the numerical aperture (NA) is greater than the second numerical aperture NA2 does not contribute to the recording or reproduction of information signals.

The lens thus designed is constituted by a curved surface such that the area where the numerical aperture (NA) is smaller than the second numerical aperture NA2 and the area where the numerical aperture (NA) is greater than the second numerical aperture are expressed by discontinuous aspherical functions.

Figure 10:
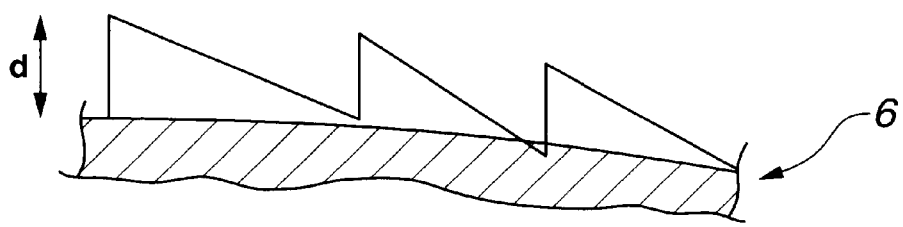
FIG. 10 is a cross-sectional view showing a blazed-shape hologram.

The shape of the hologram is a concentric blazed shape, as shown in FIG. 10, and its height d is expressed by the following formula, in which n1 represents the refractive index of the medium of the objective lens when the first wavelength λ1 is used and n2 represents the refractive index of the medium of the objective lens when the second wavelength λ2 is used.

$$0.8 \cdot \lambda 1/(n1-1) < d < 1.2 \cdot \lambda 2/(n2-1)$$

Preferably, the height d has a value expressed by the following equation.

$$d = \{\lambda 1/(n1-1) + \lambda 2/(n2-1)\}/2$$
$$= \lambda 1/2(n1-1) + \lambda 2/2(n2-1)$$

By thus selecting the height d of the blazed shape, the diffraction efficiency of the plus-first-order diffracted light of the light beam with the first wavelength λ1 and the diffraction efficiency of the plus-first-order diffracted light of the light beam with the second wavelength λ2 can be made 95% or more, respectively.

The direction of inclination of the blazed shape is such that the height is lower on the outer side than on the center side, on the entire surface of the convex lens, as shown in FIG. 10. This is for the purpose of diffracting the (plus-first-order) diffracted light toward the center of the lens by using the concentric hologram, thus correcting the insufficiently (under) corrected spherical aberration with respect to the transparent cover layer with the first thickness t1.

Meanwhile, the refractive index of the synthetic resin material used for forming the objective lens is lowered as the ambient temperature rises. Therefore, the objective lens made of the synthetic resin falls into the state of overcorrection of the spherical aberration, that is, the state of a spherical concave lens. To cancel such overcorrection of the spherical aberration, a hologram is provided to realize insufficient correction of the spherical aberration, utilizing the shift of the oscillation wavelength of the semiconductor laser toward a longer wavelength due to the rise in the ambient temperature. By thus constituting the objective lens, the spherical aberration generated by a temperature change of the objective lens made of the synthetic resin can be restrained to an unproblematic level.

As the objective lens used in this example, there is employed a single lens that is made of a synthetic resin for direct image formation on an optical disc with a light beam emitted from a light source and is of a finite type. For example, the lens has a shape as shown in the following Table 1 and has a blazed hologram at least on one surface thereof in order to cancel generation of spherical aberration due to a change in the refractive index at the time of a temperature change.

TABLE 1

R1 = 2.1215
d1 = 2.8
n1 = 1.5394
k = −5.189 × 10⁻¹
a = −5.456 × 10⁻⁵
b = −9.4759 × 10⁻⁵
c = −2.9314 × 10⁻⁵
d = −1.0406 × 10⁻⁵
R2 = −4.2433
k = 2.4455
a = 2.9388 × 10⁻²
b = −4.4017 × 10⁻³
c = 4.7331 × 10⁻⁴
d = 2.3079 × 10⁻⁵

In this case, an objective lens is designed in which if the surface of the objective lens on the light source side is a first surface and the surface on the optical recording medium side is a second surface, $$0.67 < r1/f \leq 0.70$$

holds for the radius of curvature r1 of the first surface, and $$1.33 < r2/f \leq 1.50$$

holds for the radius of curvature of the second surface, and which has a thickness of 2.5 mm or greater. With such a design, the extra-axial aberration is canceled and an objective lens having good optical characteristics can be provided.

By using the objective lens thus formed, when casting light beams of different wavelengths to the first and second optical discs having different recording densities and adapted for carrying out recording and reproduction using light beams of different wavelengths, the spherical aberration of light beams cast onto the respective optical discs can be corrected and the spherical aberration due to a temperature change can be restrained.

INDUSTRIAL APPLICABILITY

According to the present invention, generation of the spherical aberration of light beams incident on a plurality of types of optical recording media having different recording densities and using light beams of different wavelengths for recording and reproduction can be restrained. Moreover, since light beams of the same order generated by the diffracted optical element are used for different types of optical recording media, the diffraction efficiency of diffracted lights of the corresponding order can be improved.

That is, the present invention can provide an optical pickup device which enables recording and reproduction of information signals to and from a plurality of types of optical recording media while efficiently using a light beam emitted from the light source, and which eliminates the problem of a stray light due to an unwanted diffracted light and the problem of generation of aberration due to a temperature change.

What is claimed is:

1. An objective lens comprising:

a convex lens; and a diffractive optical element provided on at least one surface or in the vicinity of the convex lens, said convex lens having a first portion which is effectively covered by the diffractive optical element and a second portion which is not effectively covered by the diffractive optical element;

wherein when the convex lens condenses an incident light beam having a first wavelength onto a condensation surface via a parallel plate with a first predetermined thickness, spherical aberration is corrected in the second portion of the convex lens, and wherein when the convex lens condenses an incident light beam having a second wavelength onto a condensation surface via a parallel plate with a second predetermined thickness, spherical aberration is corrected by the diffractive optical element for the portion of the incident light beam passing through the first portion of the convex lens.

2. An optical pickup device comprising:

two light sources for emitting light beams with different wavelengths;

an objective lens for condensing the respective light beams emitted from the respective light sources onto a signal recording surface of a first or second optical recording medium via a respective transparent cover layer provided on the optical recording medium;

a light beam branch element for branching a light beam reflected by the signal recording surface from optical paths returning to the light sources; and a photodetector for receiving the light beam branched by the light beam branch element;

wherein the objective lens has a convex lens and a diffractive optical element provided on at least one surface or in the vicinity of the convex lens, and condenses diffracted lights of the same order generated by the diffractive optical element, of the two light beams with different wavelengths emitted from the respective light sources, onto the signal recording surface, thereby condensing the respective light beams onto the signal recording surface in the state where spherical aberration generated in the transparent cover layer is corrected.

3. The optical pickup device as claimed in claim 2, wherein the convex lens is made of a synthetic resin, the diffractive optical element is a blazed-shape hologram provided at least on one surface of the convex lens, and a plus-first-order diffracted light or a minus-first-order diffracted light of the hologram is used to cancel the spherical aberration generated by a change in the refractive index of the synthetic resin material forming the convex lens due to a temperature change.

4. The optical pickup device as claimed in claim 2, wherein said convex lens has a first portion which is effectively covered by the diffractive optical element and a second portion which is not effectively covered by the diffractive optical element; and wherein when the convex lens condenses a light beam emitted from a first one of the light sources onto the signal recording surface, spherical aberration is corrected in the second portion of the convex lens, and wherein when the convex lens condenses a light beam from a second one of the light sources, spherical aberration is corrected by the diffractive optical element for the portion of the light beam passing through the first portion of the convex lens.

5. The optical pickup device as claimed in claim 4, wherein the convex lens is made of a synthetic resin, the diffractive optical element is a blazed-shape hologram provided at least on one surface of the convex lens, and a plus-first-order diffracted light or a minus-first-order diffracted light of the hologram is used to cancel the spherical aberration generated by a change in the refractive index of the synthetic resin material forming the convex lens due to a temperature change.

6. The optical pickup device as claimed in claim 2, wherein the diffractive optical element is a hologram having a blazed shape and has a first-order diffraction efficiency of 75% or higher whether the wavelength of the light beams emitted from the light sources is a first wavelength $\lambda 1$ or a second wavelength $\lambda 2$.

7. The optical pickup device as claimed in claim 6, wherein the first-order diffraction efficiency of the diffractive optical element with respect to the light beams with the first wavelength $\lambda 1$ and the second wavelength $\lambda 2$ is 90% or higher.

8. The optical pickup device as claimed in claim 2, wherein the diffractive optical element is a blazed-shape hologram.

9. The optical pickup device as claimed in claim 8, wherein the direction of inclination of the blazed shape is such that the height is lower on the outer side than on the center side of the objective lens.

10. An optical pickup device comprising:

two light sources for emitting light beams with different wavelengths;

an objective lens for condensing the respective light beams emitted from the respective light sources onto a signal recording surface of a first or second optical recording medium via a respective transparent cover layer provided on the optical recording medium;

a light beam branch element for branching a light beam reflected by the signal recording surface from optical paths returning to the light sources; and a photodetector for receiving the light beam branched by the light beam branch element;

wherein the objective lens has a convex lens and a diffractive optical element provided on at least one surface or in the vicinity of the convex lens, and condenses diffracted lights of the same order generated by the diffractive optical element, of the two light beams with different wavelengths emitted from the respective light sources, onto the signal recording surface, thereby condensing the respective light beams onto the signal recording surface in the state where spherical aberration generated in the transparent cover layer is corrected;

wherein the light sources emit a light beam with a first wavelength $\lambda 1$ and a light beam with a second wavelength $\lambda 2$ longer than the first wavelength $\lambda 1$, respectively, the numerical aperture of the objective lens with respect to the light beam with the first wavelength $\lambda 1$ is a first numerical aperture NA1, the numerical aperture of the objective lens with respect to the light beam with the second wavelength $\lambda 2$ is a second numerical aperture NA2, the thickness of the transparent cover layer corresponding to the light beam with the first wavelength $\lambda 1$ is a first thickness t1, and the thickness of the transparent cover layer corresponding to the light beam with the second wavelength $\lambda 2$ is a second thickness t2 greater than the first thickness t1, wherein when the wavelength of the light beam is the first wavelength $\lambda 1$ and the numerical aperture is the first numerical aperture NA1, the spherical aberration in the case where the thickness of the transparent cover layer is the first thickness t1 is corrected to not more than $\lambda/100$ RMS by a first-order diffracted light diffracted by the diffractive optical element, and wherein when the wavelength of the light beam is the second wavelength $\lambda 2$ and the numerical aperture is the second numerical aperture NA2, the spherical aberration in the case where the thickness of the transparent cover layer is the second thickness t2 is corrected to not more than $\lambda/30$ RMS by a first-order diffracted light diffracted by the diffractive optical element.

11. The optical pickup device as claimed in claim 10, wherein the first wavelength $\lambda 1$ is 630 to 660 nm, the second wavelength $\lambda 2$ is 775 to 795 nm, the first thickness t1 is 0.6 mm, the second thickness t2 is 1.2 mm, the first numerical aperture NA1 is 0.6, and the second numerical aperture NA2 is greater than 0.4 and smaller than 0.55.

12. The optical pickup device as claimed in claim 10, wherein the convex lens is constituted by a curved surface such that an area where the numerical aperture is smaller than the second numerical aperture NA2 and an area where the numerical aperture is greater than the second numerical aperture NA2 are expressed by discontinuous aspherical functions.

13. An optical pickup device comprising:
two light sources for emitting light beams with different wavelengths;
an objective lens for condensing the respective light beams emitted from the respective light sources onto a signal recording surface of a first or second optical recording medium via a respective transparent cover layer provided on the optical recording medium;
a light beam branch element for branching a light beam reflected by the signal recording surface from optical paths returning to the light sources; and
a photodetector for receiving the light beam branched by the light beam branch element; wherein the objective lens has a convex lens and a diffractive optical element provided on at least one surface or in the vicinity of the convex lens, and condenses diffracted lights of the same order generated by the diffractive optical element, of the two light beams with different wavelengths emitted from the respective light sources, onto the signal recording surface, thereby condensing the respective light beams onto the signal recording surface in the state where spherical aberration generated in the transparent cover layer is corrected;
wherein in the case where a light beam with a third wavelength $\lambda 3$ longer than the second wavelength $\lambda 2$ and a third numerical aperture NA3 smaller than the second numerical aperture NA2 are used, the spherical aberration in the case where the thickness of the transparent cover layer is a third thickness t3 greater than the second thickness t2 is corrected to not more than $\lambda 3/50$ RMS by a first-order diffracted light diffracted by the diffractive optical element.

14. The optical pickup device as claimed in claim 13, wherein the area where the numerical aperture is greater than the second numerical aperture NA2, of the convex lens, is set so that the spherical aberration with respect to the transparent cover layer having the first thickness t1 is minimized.

15. The optical pickup device as claimed in claim 14, wherein the diffractive optical element has a smaller depth in the area where the numerical aperture of the objective lens is greater than the second numerical aperture NA2 than in the area where the numerical aperture is smaller than the second numerical aperture NA2.

16. The optical pickup device as claimed in claim 14, wherein the objective lens has the diffractive optical element formed only in the area where the numerical aperture is smaller than the second numerical aperture NA2.

17. An optical pickup device comprising:
two light sources for emitting light beams with different wavelengths;
an objective lens for condensing the respective light beams emitted from the respective light sources onto a signal recording surface of a first or second optical recording medium via a respective transparent cover layer provided on the optical recording medium;
a light beam branch element for branching a light beam reflected by the signal recording surface from optical paths returning to the light sources; and
a photodetector for receiving the light beam branched by the light beam branch element; wherein the objective lens has a convex lens and a diffractive optical element provided on at least one surface or in the vicinity of the convex lens, and condenses diffracted lights of the same order generated by the diffractive optical element, of the two light beams with different wavelengths emitted from the respective light sources, onto the signal recording surface, thereby condensing the respective light beams onto the signal recording surface in the state where spherical aberration generated in the transparent cover layer is corrected;
wherein the diffractive optical element is a blazed-shape hologram wherein the direction of inclination of the blazed shape is such that the height is lower on the outer side than on the center side of the objective lens; and wherein the depth d of the blaze is expressed by $$0.8 \cdot \lambda 1/(n1-1) < d < 1.2 \cdot \lambda 2/(n2-1)$$

in which n1 represents the refractive index of the medium of the objective lens when the wavelength of the light beam is the first wavelength $\lambda 1$, and n2 represents the refractive index of the medium of the objective lens when the wavelength of the light beam is the second wavelength $\lambda 2$.

18. An optical pickup device comprising:

a light source for emitting a light beam;

a finite-type objective lens for condensing the light beam emitted from the light source onto a signal recording surface of an optical recording medium;

a light beam branch element for branching a light beam reflected by the signal recording surface from an optical path returning to the light source; and a photodetector for receiving the light beam branched by the light beam branch element;

wherein the objective lens is made up of a convex lens made of a synthetic resin and a blazed-shape hologram provided at least on one surface of the convex lens, and uses a plus-first-order diffracted light or a minus-first-order diffracted light of the hologram to cancel spherical aberration generated by a change in the refractive index of the synthetic resin material forming the convex lens due to a temperature change.

19. The optical pickup device as claimed in claim 18, wherein the objective lens is designed so that if a surface on the light source side is a first surface and a surface on the optical recording medium side is a second surface, $$0.67 < r1/f \leq 0.70$$

holds for the radius of curvature r1 of the first surface, and $$1.33 < r2/f \leq 1.50$$

holds for the radius of curvature of the second surface, and the objective lens has a thickness of 2.5 mm or greater.

* * * * *